United States Patent Office 2,897,137
Patented July 28, 1959

2,897,137

PLATINUM CATALYST

Eugene F. Schwarzenbek, Montclair, N.J., assignor to The M. W. Kellogg Company, Jersey City, N.J., a corporation of Delaware No Drawing. Application December 16, 1953
Serial No. 398,647

13 Claims. (Cl. 208—140)

This invention relates to a novel platinum catalyst and to the method of applying the same in a hydrocarbon conversion process and, more particularly, it pertains to a novel platinum catalyst having a substantially long life under reforming conditions for upgrading light hydrocarbon oils.

At present, considerable emphasis is being placed on the use of platinum for reforming a light hydrocarbon oil such as, for example, naphtha, to a high octane quality gasoline material. The platinum catalyst results in unusually high yields of gasoline by virtue of its high activity and selectivity for reforming reactions. One method of operating the platinum hydroforming process is to select conditions by which it is possible to maintain a reaction period for at least a three month period; this is commonly referred to as the nonregenerative process. Notwithstanding the treatment of carbon-laden catalyst to revivify its properties, the point is reached when it is necessary to replace the catalyst with new or freshly made catalytic material. By virtue of the high cost of manufacture of platinum catalyst it is important to operate the hydroforming process under conditions to prolong catalyst life. By means of the present invention a novel catalyst for use in hydrocarbon conversion processes is proposed which has substantially long catalyst life.

The object of this invention is to provide a novel platinum catalyst.

Another object of this invention is to provide a hydrocarbon conversion process in which a novel catalyst is employed.

Still another object of this invention is to provide a novel catalyst which possesses unusually long life for hydrocarbon conversion processes.

A further object of this invention is to provide a reforming process for light hydrocarbon oils which utilizes a platinum catalyst of exceptionally long life.

A still further object of this invention is to provide a method of producing a novel platinum catalyst.

Other objects and advantages of this invention will become apparent from the following description and explanation thereof.

In accordance with the present invention a novel platinum catalyst is proposed which comprises: (1) a catalyst containing about 1 to about 25% by weight of platinum supported on a carrier material in physical admixture with (2) a carrier material in an amount sufficient to provide an average platinum concentration of about 0.05 to about 0.95% by weight in the mixture.

In another aspect of this invention my novel catalyst is employed in a hydrocarbon conversion process which comprises contacting a hydrocarbon reactant under suitable conversion conditions with a composition comprising a catalyst containing about 1 to about 25% by weight of platinum supported on a carrier material physically admixed with a carrier material in an amount sufficient to provide an average platinum concentration of about 0.05 to about 0.95% by weight in a resultant mixture. In general, the hydrocarbon conversion process is effected at a temperature of about 600° to about 1250° F., a pressure of about 1 atmosphere to about 2000 p.s.i.g., a weight space velocity of about 0.01 to about 15, and in the case of a moving bed system, a catalyst oil ratio of about 0.001 to about 20.

The catalysts employed in the present invention possess numerous outstanding advantages and have a wide field of utility. In general, it appears that these contact materials are suitable for any reactions which are susceptible to catalysis with platinum. It is useful in a variety of hydrocarbon conversion reactions, particularly those in which the hydrogen-carbon ratio is altered. Among the numerous reactions which lend themselves to catalysis by contact materials of the type disclosed herein are dehydrogenation, hydrogenation, hydrogenolysis, cracking, hydrocracking (i.e., cracking under hydrogen pressure), isomerization, oxidation, aromatization, cyclization, hydrodesulfurization, hydrocarbon synthesis, dealkylation, hydrodechlorination, dehydroxylation, alkylation, polymerization and hydrogen exchange systems. In general, these reactions may be carried out under the conventional reaction conditions of temperature, pressure, etc., with the catalysts described herein. A wide variety of organic compounds may be dehydrogenated including naphthenes, paraffins, alkyl radicals in aralkyl compounds, butenes, sterols, glycerides, and many other organic compounds. By changing the reaction conditions in a suitable manner, these catalysts are also effective for hydrogenating organic compounds in general, and especially fatty glycerides and olefins. They may also be employed in the hydrogenolysis of nitrobenzene to aniline and similar chemical changes. Another utilization lies in the dehydroxylation or demethylation, or both, of cresylic acid-type compounds. Among the substances which can be isomerized with these catalysts, paraffins and naphthenes are the most significant feeds from a commercial standpoint; but polyalkyl aromatics may be similarly treated, as exemplified in the catalytic transformation of o-xylene to p-xylene. In addition to the more common cracking reactions, the contact materials of the present invention are especially suitable for cracking in the presence of hydrogen as, for example, in the hydroforming process in which the feed is customarily a low octane naphtha. In hydroforming, a substantial degree of sulfur removal occurs and the reaction may readily be shifted to favor hydrodesulfurization rather than reforming by changing the reaction conditions in a manner familiar to those skilled in the art. The synthesis of hydrocarbons from carbon monoxide and hydrogen in the presence of the contact materials is also contemplated. In the field of oxidative reactions, numerous changes can be effected with the present catalysts including, for example, the transformation of sulfur dioxide to sulfur trioxide, the formation of nitric acid and also of hydrazine from ammonia, the conversion of urea into hydrazine and the oxidation of hydrocarbons in general. An example of a catalytic dechlorination reaction of current importance, which may be catalyzed, is that in which hydrogen converts trifluorotrichloroethane into trifluorochloroethylene and hydrogen chloride. The contact materials of the present invention are also suitable for the hydrogen exchange systems as exemplified by the hydrogenation of coal with decalin and tetralin. By reason of their aromatizing and cyclizing characteristics they are outstanding in preparing benzene, toluene and the like in substantial yields from paraffins and naphthenes and also for the production of more highly cyclized compounds such as naphthalene, anthracene and alkyl substituted derivatives thereof under suitable conditions. In addition, polymerization and alkylation reactions are responsive to these catalysts; for example, the polymerization of olefins and the alkylation of aromatic compounds.

The present invention is particularly adapted to upgrading light hydrocarbon oils for the production of high octane quality gasoline. The light hydrocarbon oil is, for example, gasoline, naphtha and kerosene. For this purpose the reaction temperature is about 700° to about 1075° F., more usually, about 800° to about 975° F. At the temperature specified, the reaction pressure can be varied over a wide range including a pressure of about 25 to about 1000 p.s.i.g., more usually, about 50 to about 500 p.s.i.g. The quantity of oil feed which is processed relative to the quantity of catalyst used is measured in terms of the weight space velocity, that is, the pounds of oil feed charged to the reaction zone on an hourly basis per pound of catalyst which is present therein. In general, the weight space velocity can be varied from about 0.05 to about 10 Wo/hr./Wc, more usually, about 0.25 to about 5.0 Wo/hr./Wc. The reaction is conducted in the presence of added hydrogen and the hydrogen charged to the process is measured in terms of the standard cubic foot (60° F. at 760 mm. of mercury) per barrel of oil feed (42 gallons per barrel) which is abbreviated as s.c.f.b. The hydrogen serves to suppress carbon formation, and in general, it is charged to the reaction zone at the rate of about 500 to about 15,000 s.c.f.b., more usually, 1000 to about 7500 s.c.f.b.

As previously indicated, the novel composition of the present invention comprises a catalyst containing about 1 to about 25% by weight of platinum supported on a carrier material physically admixed with a carrier material in an amount sufficient to provide an average platinum concentration of about 0.05 to about 0.95% by weight of the mixture. Since the platinum concentration on a catalyst is directly related to the life of the catalyst, it is preferred to employ the platinum containing component having about 5 to about 20% by weight of platinum supported by a carrier material. The carrier material which serves to dilute the platinum concentration of the mixture is added preferably in amounts sufficient to provide about 0.25 to about 0.75% by weight of platinum therein. Generally, higher average platinum concentrations in the mixture of components are not warranted on the basis of the improvements obtained with respect to activity and selectivity of the catalyst, in view of the additional cost of manufacturing the catalyst.

The carrier material to be used as one component of the catalyst can be any one of the widely known materials which are suitable for this purpose. Examples of carrier materials which can be used for the purpose of this invention are alumina, silica-alumina in which silica constitutes about 20–90% of support and it is prepared to have a low surface area, i.e., about 10–75 square meters per gram, activated carbon or charcoal, pumice, bauxite, kieselguhr, fuller's earth, silica, zinc spinel, etc. The preferred carrier material for use either as the carrier material component or as the support for the platinum containing component is alumina. The alumina can be either the gamma or the eta-type or a mixture of the two. As previously indicated the carrier material serves to dilute the platinum concentration of the mixture to a quantity which is economical and effective for hydrocarbon conversion processes. The carrier material should be one which has no significant adverse effects upon the intended process. Further, in some instances it may be desirable to employ as the carrier material component a material which is different than the carrier material upon which the platinum is supported. The carrier material can be prepared in any suitable manner which is well-known in the art, hence it is not necessary to describe these methods herein. In some instances it is desirable to incorporate a small amount of silica, viz., about 1 to about 12% by weight, based on a total mixture, in order to enhance the stability of the mixture at elevated temperatures.

In the preparation of the catalyst, the carrier material is simply physically admixed with the platinum containing component in a manner such that there is substantially no deposition of platinum on the carrier component. In essence, the mixture of components forming the novel catalyst comprise particles containing a high platinum content and particles substantially free of platinum. The step of mixing the components can be facilitated by the use of each component in a finely divided state in order that adequate mixing can be readily attained. The catalyst in the finely divided state can be used as such or the mixture can be molded or formed into pills, granules or lumps whichever form is desirable for the intended operation.

The platinum containing component comprises platinum supported on a carrier material, and this carrier material can be anyone or more of those described hereinabove in connection with the carrier material component. In the preparation of the platinum containing component, it is customary to use a compound of platinum for admixture with the carrier material, in order to obtain uniform distribution or dispersion of the platinum compound throughout the carrier material. Thereafter by suitable treatment, the compound of platinum is decomposed, thus depositing platinum metal on the carrier material. The conversion of the platinum compound can be effected by calcination or by reduction with a suitable reducing agent such as, for example, hydrazine, citric acid, hydrogen, etc. The compound of platinum which can be used for this purpose includes any one or more of the suitable forms which are known in the prior art. In the precursor state, the platinum can be present in the form of, for example, ammine complex, potassium chloroplatinate, chloroplatinic acid, platinum sulfide or polysulfide, etc. The quantity of precursor material used in the catalyst preparation will depend on the final concentration of platinum metal desired. Further the precursor can be used as an impregnant for the dried and/or calcined carrier material, or it can be combined with the carrier material in a sol or gel form.

In addition, the platinum catalyst can contain activating or promoting agents. A promoting agent is halogen, e.g., fluorine, chlorine, etc., which is chemically combined in the finished catalyst. Other activating or promoting agents are, for example, metals such as mercury, zinc or cadmium, or a compound thereof; an alcohol and/or a ketone having a water solubility of at least about 0.05% by weight at 70° F., etc. The activating agent includes, for example, the organic or inorganic salts of mercury, zinc and cadmium, e.g., the chlorides, sulfates, nitrates, acetates, carbonates, formates, etc. Specific examples are mercuric acetate, zinc acetate, cadmium acetate, zinc butyl carbonate, cadmium phthalate, etc. Other promoting agents include the aliphatic alcohols and ketones. Specific examples of these materials are ethanol, butyl alcohol, acetone, methylethyl ketone, etc. The quantity of activating or promoting agent employed in the preparation of the catalyst is about 0.01 to about 15% by weight, based on the carrier material.

A very effective precursor compound of platinum for the preparation of the platinum containing component is the ammine complex. In general, these complexes involve the use of a platinous salt in the preparation thereof. A widely used complex is platinous ammine halide, including, for example, platinous ammine chloride, etc. An excellent ammine complex for use in the present invention is platinous tetrammine chloride. For additional disclosure of the various promoting and activating agents which can be used for this invention, reference is to be had to co-pending applications, Serial No. 248,470, filed September 26, 1951, now U.S. Patent No. 2,760,940; Serial No. 226,100, filed May 12, 1951, now abandoned; and Serial No. 242,031, filed August 15, 1951, now U.S. Patent No. 2,662,861.

Following the step of combining the ingredients of the platinum containing component, the mixture can be dried. In the drying step, a temperature of not more than about 400° F. is employed, more usually, about 175° F. to about 300° F. This treatment is conducted for a period of about .01 to about 60 hours, more usually, about .01 to about 50 hours. The drying step is optional, because, if desired, the mass of ingredient can be subjected immediately to an elevated temperature at which calcination occurs. Calcination is effected at a temperature greater than about 400° F., more usually, about 600° to about 1500° F. and preferably, about 900° to about 1100° F. The calcination treatment usually is carried out for a period of about 1 to about 20 hours, more usually, about 2 to about 8 hours. As previously indicated, the finished catalyst or component contains about 1 to about 25% by weight of platinum, based on the total catalyst, preferably about 5 to about 20% by weight of platinum, on a similar basis.

The present invention is also applicable for a fluidized platinum system. By reason of the high cost of platinum catalyst, it is preferred for the purposes of the fluid system to employ the platinum containing component of larger particle size than the carrier material component in order to minimize the loss of platinum by entrainment or carry-over in the effluent gaseous streams of the processing zones. For this purpose, it is contemplated using the platinum containing component in particle sizes of about 60 to about 200 microns, more usually, about 80 to about 150 microns, and the carrier material component can have a particle size of about 10 to about 150 microns, more usually, about 20 to about 100 microns. The ranges of particle sizes specified above for both components overlap. However, it should be understood that the average particle size for the platinum containing component is preferably at least about 50 microns larger than the average particle size for the carrier material component. In the case of fluid hydroforming utilizing the platinum catalyst, the heat of reaction is even greater than in the case of fluid hydroforming using molybdenum oxide catalyst. Various means of supplying the necessary heat of reaction which are well-known in the art can be employed for the purpose of the present invention. However, an especially effective method is to employ an average platinum concentration of the mixture comprising the platinum containing component and the carrier material component in the preferred range of about 0.01 to about 0.10% by weight, based on the total mixture. In order to compensate for a decrease in catalyst performance by reason of the smaller platinum concentration, a preferred catalyst-oil ratio in the order of about 1 to about 20, more usually, about 5 to about 10 is employed. At high catalyst oil ratios, the sensible heat acquired by the total catalyst during regeneration treatment can be utilized in the reaction zone. Accordingly, by the use of high catalyst oil ratios and low platinum containing compositions, it is proposed supplying a substantial part of the heat of reaction from the regeneration zone. The temperature, pressure, space velocity and hydrogen feed rate to the reaction zone can be in the same range as specified above in connection with the fixed bed process. Since in the preferred ranges of operating conditions for a fluid system the total catalyst composition contains an average platinum concentration which is substantially lower than specified hereinabove, it is contemplated using a platinum concentration for the platinum containing component in the amount of about 0.25 to about 20% by weight of platinum. The carrier material component is added to the platinum containing component in an amount sufficient to provide a preferred average platinum concentration of about 0.01 to about 0.10% by weight of the mixture. It should be understood, however, that the fluid system can be operated under the general conditions of temperature, pressure, space velocity, hydrogen rate and catalyst to oil ratio specified hereinabove and with a catalyst mixture containing about 0.05 to about 0.95% by weight of platinum. Thus, the platinum concentration of the mixture is about 0.01 to 0.95% by weight, and the platinum containing component has about 0.25 to about 25% by weight. The carrier material to be used as a support for the platinum containing component or as a carrier material component can be any one or more of those specified hereinabove in the description of the catalyst. For the fluid system, alumina is the preferred support and/or carrier material component for the catalyst mixture.

The complete regeneration treatment of the catalyst in the fluid system is effected at a temperature in the range of about 500° to about 1200° F. The temperature of the completely regenerated catalyst is preferably at least about 100° greater than the reaction temperature in order that the heat of combustion liberated in the regeneration zone can be utilized for supplying the required heat of reaction in the reforming zone. The first phase of the regeneration is conducted with an oxygen containing gas, viz., air, oxygen or a diluted air stream containing about 1 to about 10% by volume of oxygen. For this regeneration treatment, it is preferred to employ conditions resulting in a mild treatment, such that substantially all of the carbonaceous material is removed. Following the mild treatment or first phase of regeneration it is contemplated employing a more drastic or severe treatment involving the use of a regeneration gas containing an oxygen partial pressure of about 5 to about 200 p.s.i.a., more usually, an oxygen partial pressure of about 14.7 to about 150 p.s.i.a. The temperature of the severe treatment can be varied over the range specified hereinabove. A significant difference between the mild and severe treatments is the oxygen partial pressure of the regeneration gas. For a mild operation it is preferred to use an oxygen partial pressure of about 0.05 to about 2.75 p.s.i.a. and a preferred temperature of about 500° to about 900° F. For the severe treatment the preferred temperature is about 900° to about 1200° F.

After the regeneration treatment, the catalyst can be pretreated with a hydrogen containing gas at a temperature of about 600° to about 1050° F. The hydrogen treatment serves to remove any adsorbed or absorbed hydrogen on the catalyst surface or any oxygen which is chemically combined with the platinum. It is also contemplated circulating the regenerated catalyst directly to the reaction zone because the conditions existing in the reforming zone are adequate for the catalyst to have restored substantially all of its catalytic properties. For the sake of higher yields of reformed liquid product, it is preferred that the completely regenerated catalyst is pretreated with hydrogen before being returned to the reaction zone.

Having thus provided a description of the present invention, reference will now be had to specific examples in order to obtain a fuller understanding thereof.

In order to ascertain the effect of platinum content on the life of a platinum catalyst for reforming naphtha, a series of runs were made involving platinum catalysts containing 0.3, 0.5 and 0.7% by weight of platinum on alumina. These catalysts were tested under comparable operating conditions in order to determine the activity decline rate measured as the decline of octane number of the liquid product, averaged on an hourly basis.

The results of these tests are tabulated below.

| Run No. | 1 | 2 | 3 |
| --- | --- | --- | --- |
| Weight percent Pt in catalyst | 0.3 | 0.5 | 0.7 |
| Octane number decline of liquid product per hour | 3.3 | 2.4 | 2.1 |

From the above data, it is noted that as the platinum content increased, the rate of decline in octane number of liquid product decreased. Hence, catalysts containing high platinum content are to be favored from the standpoint of catalyst life.

In view of the effect of platinum content on the life of a platinum catalyst it was felt desirable in accordance with the present invention to employ a catalyst comprising a mixture of a high platinum catalyst and a carrier material. In order to determine the effect of diluting high platinum containing catalyst with another material, another experiment was made in which a catalyst containing 15% by weight of alumina physically admixed with alumina to provide about 0.5% by weight of platinum in the mixture was evaluated by comparison with a catalyst in which each particle contained an average platinum concentration of about 0.5% by weight. The results of these experiments are reported below.

The catalysts employed in this evaluation were prepared by the methods given below.

CATALYST I

The alumina gel used in this catalyst preparation was obtained by precipitating aluminum chloride with ammonium hydroxide. The hydrous alumina gel thus obtained contained 19.63% $Al_2O_3$. 510 grams of alumina gel were placed in a 4 liter beaker and then slurried with 259 cc. of water. The slurry contained 13% alumina and it had a pH of 8.35 at 25.5° C. 6 cc. of glacial acetic acid diluted with 12 cc. of water were added to the alumina slurry. The slurry had a pH of 4.10 and it was stirred for about 26 minutes. Platinous tetrammine chloride was prepared by dissolving 24.2 grams of platinous chloride in several liters of boiling concentrated ammonium hydroxide. The excess ammonia was evaporated and the solution allowed to cool before adding 4 cc. of glacial acetic acid to obtain a pH of 6.4. The final solution was diluted with water to a total volume of 1000 cc. The solution was added to the peptized alumina slurry and the total mixture was stirred thoroughly. 569 cc. of water were added to the mixture and after stirring the mixture had a pH of 4.35 at 31° C. The activated alumina was spray dried using an inlet temperature of 800° F. and an outlet temperature of 260° F. at the rate of 240 ml. per minute. The dried catalyst contained approximately 15% by weight of platinum. The spray dried catalyst was diluted with dried alumina in a quantity sufficient to provide a final platinum concentration of 0.5% by weight. The alumina used for this purpose was dried at 230 to 240° F. 30.6 grams of the dried catalyst were thoroughly mixed with 890 grams of the dried alumina. The dried alumina analyzed 65.1% solids by ignition loss whereas the dried catalyst analyzed 65.4% solids by ignition loss. The total mixture was calcined at 1000° F. for a 3 hour period. The catalyst contained 0.53% platinum. A charge of 500 cc. of catalyst weighing 405 grams was employed for the purpose of evaluation.

CATALYST II

Alumina gel, which was prepared by the precipitation of aluminum chloride with ammonium hydroxide, containing 528 grams of $Al_2O_3$, was slurried in 2 liters of water and then peptized with 58 cc. of glacial acetic acid which was diluted with an equal volume of water. The peptized alumina had a pH of 4.57 at 22° C. 4.1 grams of platinum chloride were dissolved in 450 cc. of concentrated ammonium hydroxide. The pH of the solution was lowered to about 7 by the use of glacial acetic acid and then the solution was diluted with 400 cc. of water. The platinum tetrammine chloride solution was combined with the peptized alumina gel thus forming a slurry. The slurry was calcined for 2 hours at 1000° F. The calcined catalyst was ground to a powder form and then put into 3/16 inch pills. The catalyst pills were again calcined for a 4 hour period at 1000° F. This catalyst contained 0.49% platinum.

The feed stock employed for this evaluation is given below in Table I.

Table I

| | |
|---|---|
| Feed designation | A |
| °API gravity | 51.3 |
| ASTM Distillation, vol. percent: | |
| I.B.P. | 236 |
| 5 | 267 |
| 10 | 275 |
| 20 | 291 |
| 30 | 303 |
| 40 | 315 |
| 50 | 326 |
| 60 | 338 |
| 70 | 349 |
| 80 | 364 |
| 90 | 385 |
| E.P. | 426 |
| Octane No., CFRR clear | 27.6 |
| Aromatics, vol. percent | 9.0 |
| Olefins, mol percent | 1.0 |
| Watson factor | 11.89 |
| Molecular weight | 134 |

The evaluation of the catalysts described above is reported in Table II below.

Table II

| Run No. | 1 | 2 |
|---|---|---|
| Feed | A | A |
| Catalyst | I | II |
| Temperature | 906 | 897 |
| Pressure | 500 | 500 |
| Space vel., Wo/hr./Wc | 1.06 | 0.97 |
| $H_2$ rate, s.c.f.b | 4,858 | 4,970 |
| Length of run, hr | 8 | 8 |
| Yields: | | |
| $C_4$ free gasoline, vol. percent | 85.5 | 85.9 |
| 100% $C_4$ gasoline, vol. percent | 89.1 | 90.7 |
| 10% RVP gasoline, vol. percent | 95.3 | 95.5 |
| Polymer, vol. percent | 3.3 | 2.3 |
| Carbon, weight percent | 0.050 | |
| Dry gas, weight percent | 6.4 | 6.4 |
| Inspections: Octane number, CFRR— | | |
| $C_4$ free liquid product | 78.0 | 71.4 |
| 100% $C_4$ gasoline | 78.9 | 73.0 |
| 10 RVP gasoline | 80.3 | 74.7 |

In Table II above, it is clearly shown that the catalyst prepared by diluting a high platinum containing catalyst with alumina gave a better product distribution than the catalyst which was prepared to provide individual particles containing the same platinum concentration as the mixture. It is significant to note that the yields are essentially the same; however, the octane quality of the various liquid products reported is substantially better in the case of a mixture comprising a platinum containing component and an alumina component. In view that high platinum concentration results in longer catalyst life, and further, that the mixture of high platinum catalyst and alumina produce better product distribution, it is apparent that there are distinct advantages in practicing the present invention.

Having provided a description of my invention along with specific examples thereof, it should be understood that no undue restrictions or limitations are to be imposed by reason thereof, but that the present invention is defined by the appended claims.

I claim:

1. A hydrocarbon conversion process which comprises contacting a hydrocarbon reactant under conversion conditions including a temperature of about 600° F. to about 1250° F., a pressure of about 1 atmosphere to about 2000 p.s.i.g., and a weight space velocity of about 0.01 to about 15, with a contact material comprising particles of a catalyst containing about 1 to about 25% by weight of platinum supported on a carrier material in physical admixture with particles of a carrier material in an amount sufficient to provide an average platinum concentration of about 0.05 to about 0.95% by weight of the mixture.

2. The process of claim 1 wherein the carrier material on which said platinum is supported is alumina.

3. A hydrocarbon conversion process which comprises contacting the hydrocarbon reactant under conversion conditions including a temperature of about 600° to about 1250° F., a pressure of about 1 atmosphere to about 2000 p.s.i.g., a weight space velocity of about 0.01 to about 15 in contact with a material comprising particles of a catalyst containing about 5 to about 20% by weight of platinum supported on alumina in final admixture with particles of alumina in an amount sufficient to provide an average platinum concentration of about 0.25 to about 0.75% by weight of the mixture.

4. A reforming process which comprises contacting a light hydrocarbon oil at a temperaure of about 700° F. to about 1075° F., a pressure of about 25 to about 1000 p.s.i.g. and a weight space velocity of about 0.05 to about 10, with a contact material comprising particles of a catalyst containing about 1 to about 25% by weight of platinum supported on a carrier material in physical admixture with particles of a carrier material in an amount sufficient to provide an average platinum concentration of about 0.05 to about 0.95% by weight of the mixture.

5. The process of claim 4 wherein each of said carrier materials is alumina.

6. A reforming process which comprises contacting a light hydrocarbon oil under suitable reforming conditions including a temperature of about 700° to 1075° F., a pressure of about 25 to about 1000 p.s.i.g., a weight space velocity of about 0.05 to about 10 with a contact material comprising particles of a catalyst containing about 5 to about 20% by weight of platinum supported on alumina in physical admixture with separate particles of alumina in an amount sufficient to provide an average platinum concentration of about 0.25 to about 0.75% by weight of the mixture.

7. A fluid reforming process which comprises contacting a light hydrocarbon oil at a temperature of about 700° F. to about 1075° F., a pressure of about 25 to about 1000 p.s.i.g. and a weight space velocity of about 0.05 to about 10, with a fluidized mass of finely divided contact material comprising a catalyst containing about 1 to about 25% by weight of platinum supported on a carrier material having a particle size of about 60 to about 200 microns in physical admixture with a carrier material having a particle size in the range of about 10 to about 150 microns and less than the particle size of the platinum containing catalyst, said carrier material being present in an amount sufficient to provide an average platinum concentration of about 0.05 to about 0.95% by weight of the mixture.

8. A fluid reforming process which comprises contacting a light hydrocarbon oil at a temperature of about 700° F. to about 1075° F., a pressure of about 25 to about 1000 p.s.i.g. and a weight space velocity of about 0.05 to about 10, in a reaction zone with a fluidized mass of finely divided contact material comprising particles of a catalyst containing about 0.25 to about 20% by weight of platinum supported on a carrier material in physical admixture with particles of a carrier material in an amount sufficient to provide an average platinum concentration of about 0.01 to about 0.10% by weight of the mixture, thus producing a reformed liquid product and contaminating the catalyst with a carbonaceous material; withdrawing contaminated catalyst from the reaction zone and passing the same to a regeneration zone wherein the carbonaceous material is removed substantially by combustion with an oxygen containing gas, withdrawing regenerated catalyst at a temperature significantly greater than the temperature in the reaction zone and at a rate sufficient to provide a catalyst to oil ratio of about 5 to about 10 and thus providing a substantial part of the required heat of reaction by utilization of the heat of combustion in the regeneration zone.

9. A fluid reforming process which comprises contacting a light hydrocarbon oil at a temperature of about 700° F. to about 1075° F., a pressure of about 25 to about 1000 p.s.i.g. and a weight space velocity of about 0.05 to about 10, in a reforming zone with a fluidized mass of finely divided contact material comprising a catalyst containing about 1 to about 25% by weight of platinum supported on alumina having an average particle size of about 80 to about 150 microns in physical admixture with a carrier material having an average particle size in the range of about 20 to about 100 microns, the average particle size of the catalyst containing platinum being at least about 50 microns greater than the average particle size of the carrier material in physical admixture therewith, said carrier material being present in amount sufficient to provide an average platinum concentration of about 0.05 to about 0.95% by weight of the mixture, and thereby the effluent gaseous stream from the reforming zone contains entrained therewith substantially more carrier material than the platinum containing alumina.

10. A fluid reforming process which comprises contacting a light hydrocarbon oil at a temperature from about 800° F. to about 975° F., a pressure of about 50 to about 500 pounds per square inch gage and a weight space velocity of about 0.25 to about 5.0, in a reaction zone with a fluidized mass of finely divided contact material comprising particles of a catalyst containing about 0.25 to about 25% by weight of platinum supported on alumina in physical admixture with particles of a carrier material in an amount sufficient to provide an average platinum concentration of about 0.01 to about 0.95% by weight of the mixture, thus producing a reformed liquid product and contaminating the catalyst with the carbonaceous material, withdrawing contaminated catalyst from the reaction zone and passing the same to a regeneration zone wherein the carbonaceous material is removed substantially by combustion with an oxygen containing gas, withdrawing regenerated catalyst at a temperature significantly greater than the temperature in the reaction zone and at a rate sufficient to provide a catalyst to oil ratio of about 1 to about 20 and thus providing a substantial part of the required heat of reaction by utilization of the heat of combustion in the regeneration zone.

11. A catalyst composition comprising a physical mixture of particles of an alumina carrier and separate particles of a solid diluent, said particles of alumina carrier being impregnated with platinum in an amount of 1 to about 25 weight percent of said alumina carrier particles, and said diluent particles being substantially free of platinum and present in an amount at least equivalent to three times by weight of said alumina carrier to provide an average platinum concentration of between about 0.25 and about 0.75 percent by weight of the mixture.

12. A catalyst composition comprising a physical mixture of particles of an alumina carrier impregnated with platinum in an amount of 15 weight percent, and as a diluent separate particles of alumina substantially free of platinum and present in an amount sufficient to provide an average platinum concentration of about 0.53 percent by weight of the mixture.

13. A method of preparing a catalyst which comprises impregnating an alumina carrier with a platinum compound in an amount sufficient to provide in the finished catalyst, particles containing from 1 to about 25 percent by weight of platinum based on the weight of the alumina carrier, drying the resultant mixture, combining particles of dried alumina substantially free of platinum with the said platinum impregnated alumina particles in an amount at least equivalent to three times by weight of said platinum impregnated alumina particles, to provide a physical mixture of particles of platinum impregnated alumina and separate particles of the alumina substantially free of platinum, the overall platinum concentration of the catalyst being between about 0.25 and about 0.75 percent by weight.

References Cited in the file of this patent

UNITED STATES PATENTS

| | | |
|---|---|---|
| 2,005,412 | Connolly et al. | June 18, 1935 |
| 2,472,844 | Munday et al. | June 14, 1949 |
| 2,550,531 | Ciapetta | Apr. 24, 1951 |
| 2,643,214 | Hartwig | June 23, 1953 |
| 2,708,187 | Kearby | May 10, 1955 |